Patented Feb. 6, 1940

2,189,599

UNITED STATES PATENT OFFICE 2,189,599

PROCESS OF PREPARING CYANINE DYES WITH STRONG ORGANIC BASES

Leslie George Scott Brooker, Rochester, N. Y., assignor, by mesne assignments, to Eastman Kodak Company, Rochester, N. Y., a corporation of New Jersey No Drawing. Application January 16, 1933, Serial No. 651,870

17 Claims. (Cl. 260—240)

It is well known that a number of cyanine dye condensations are brought about by using basic media or else by the use of inorganic alkalies.

For instance, dyes of what is known as the $\psi$-cyanine type have been prepared by the action of caustic potash, in absolute ethyl alcoholic solution, on a suitable mixture of alkyl quaternary salts of heterocyclic bases. (cf. Hamer J. C. S. 1928, 206.)

Again, dyes of the carbocyanine series have been prepared by the use of pyridine as a basic solvent, part of the function of this solvent being to combine with the elements of acid split off during the condensation. (cf. Hamer J. C. S. 1927, 2796.)

Again, dyes of what has been called the tricarbocyanine series have been prepared by the action of sodium alcoholate on a mixture of a quaternary salt and dinitro phenyl pyridinium chloride (B. P. 351, 555) or on a mixture of glutaconic aldehyde dianilide hydrochloride and appropriate quaternary salt (B. P. 354, 826).

It is an object of this invention to provide a process for effecting various condensations in the preparation of dyes by the use of strong organic bases, such as piperidine, diethylamine, triethylamine, or the like. One advantage of this process is that in general the yields of product are much higher than by older methods and in some cases products are obtainable which have been inaccessible using the older methods. It is a further object of my invention to provide certain new and useful dyes. Other objects will appear hereinafter.

Distinction should be drawn between the isolated use of these organic bases in small quantities as catalysts and their employment in the present instance in molecularly equivalent amounts. In the present case, a perusal of the examples will show that the strong organic base is used to bind molecular proportions of acid, and the two types of reaction are, therefore, entirely different. In the present invention the bases are not used as catalysts, but as preferred acid-binding agents.

The bases which I use, such as n-butylamine, diethylamine, triethylamine, tri n-butylamine, piperidine, n-methyl piperidine, triethanolamine and $\beta$-diethylamino ethyl alcohol, are of the substituted ammonia type and are recognized as being strong organic bases; these bases have a dissociation constant substantially greater than the dissociation constant of pyridine. They may also be employed in the form of their salts with weak acids, for instance, guanidine carbonate is quite useful, as is shown in the examples hereinafter.

In $\psi$-cyanine condensations, higher yields are in general obtained when the strong organic base triethylamine is employed compared with when potassium hydroxide is employed. (See, for instance, my copending application Serial No. 619,960, filed June 29, 1932.)

For instance, in the preparation of 1,1'-diethyl-$\psi$-cyanine iodide, a well known dye, the yield of unrecrystallized dye made using triethylamine amounts to as much as 80% of the theoretical, whereas the yield using caustic potash is decidedly lower. In the preparation of 2,1'-diethylthio-$\psi$-cyanine iodide, when triethylamine is used (2.1 mols. of base to each 1 mol. of reacting salts) the yield obtained is around 90%. Using caustic potash under comparable conditions, the yield is appreciably less, being only from 70–75%. The corresponding selenium-containing dye may be similarly prepared.

The results are still more striking with 2,1'-diethyl oxa-$\psi$-cyanine iodide, a new die. This dye, which possesses the following structure,

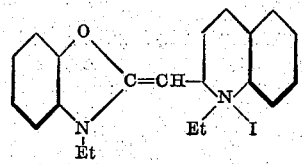

is obtainable when caustic potash (2 mols.) is allowed to react in absolute ethyl alcoholic solution on a hot mixture of 1-methylbenzoxazole ethiodide and 2-iodoquinoline ethiodide. The yield, however, in that case is small, being around 7%, and this remains roughly the same when sodium ethylate is used in place of the caustic potash. However, when triethylamine is used the yield of unrecrystallized, but substantially pure dye, is around 67%.

Of the various methods suggested in my copending application (Serial No. 619,960) for the preparation of $$\text{dialkyl-}\begin{Bmatrix}\text{ox}\\\text{thi}\\\text{selen}\end{Bmatrix}\text{azolo-}\psi\text{-cyanine dyes,}$$

those methods in which triethylamine are used are preferred for the reason that the yields are usually better.

Usually triethylamine, tri n-butylamine, $\beta$-diethylaminoethyl alcohol and such tertiary bases, give very high yields of the $\psi$-cyanine dyes, and these bases are consequently preferred. Guanidine carbonate is quite good too for the preparation of 2,1'-diethylthio-$\psi$-cyanine iodide and of 1,1'-diethyl-$\psi$-cyanine iodide, the yields being 85% and 80% respectively, under the conditions employed. This reagent, however, is less suitable for preparing 1,2'-diethyloxa-$\psi$-cyanine iodide. Piperidine too, while giving about a 40% yield of 2,1'-diethylthio-$\psi$-cyanine iodide, gives a small yield of 2,1'-diethyloxa-$\psi$-cyanine iodide or of 1,1'-diethyl-ψ-cyanine iodide, but diethylamine gives an 80% yield of this first dye, a 20% yield of the second, and a 30% yield of the third dye.

The bases should be pure and anhydrous and the details of preparation of the dyes are furnished in the examples.

A further witness to the improvement in the method brought about by the use of triethylamine and the like in condensations of the ψ-cyanine type is afforded by the reaction between 2-iodoquinoline alkyl iodide and α-picoline alkyl iodide. When caustic potash is employed, a ψ-cyanine cannot be isolated (Hamer and Kelly, J. C. S. 1931, 778, see also B. P. 369, 947, page 1, line 32) but when triethylamine is employed, the dye can readily be isolated.

Furthermore, it was not found possible (B. P. 369, 947, p. 1, 1.21) to prepare a cyanine dye of the constitution

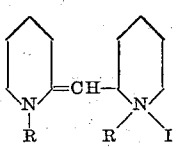

using potassium hydroxide, but using triethylamine this can be accomplished. Similarly it is also possible to prepare such ψ-cyanine dyes as

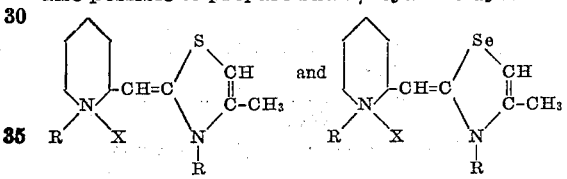

using 2-iodopyridine alkyl iodide and the appropriate quaternary salts of cyclic ammonium bases containing reactive methyl groups.

The dyes known as the isocyanines may also conveniently be prepared using the strong organic bases, and an example appears hereinafter showing how to prepare the dye 2,1'-diethylselenoisocyanine iodide.

My new process is generally and particularly useful in preparing carbocyanine, dicarbocyanine and tricarbocyanine dyes, i. e. cyanine dyes containing a polymethenyl chain, e. g. a trimethenyl, a pentamethenyl or a heptamethenyl chain.

The inability to obtain 8-methyl substituted oxacarbocyanines has been recorded (Hamer, J. C. S. 1928, 3162), but these dyes can be obtained when the base triethylamine is used in addition to the pyridine formerly used alone, showing clearly that the strong organic bases are by no means equivalent in action to pyridine.

The reaction may be expressed as follows

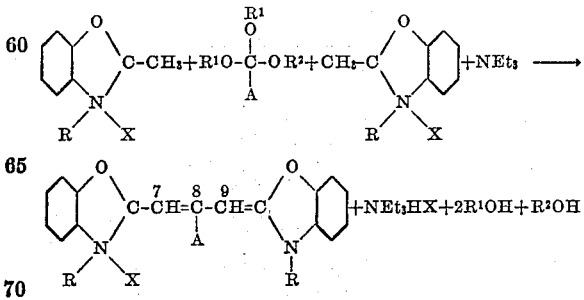

R, R¹ and R² are alkyl groups which may be similar or dissimilar. X is an acidic radical such as iodide or p-toluenesulfonate and A is the substituent grouping, usually alkyl, which it is desired to introduce into the 3-carbon oxacarbocyanine chain. The compound $A.C(OR^1)_2(OR^2)$ is an ortho-ester of a carboxylic acid which contains the substituent grouping A, such ortho-esters having been described in some detail in my U. S. Patents Nos. 1,846,301, 2, 3 and 4. The reaction is conveniently performed in pyridine, the ortho-ester being employed in excess and the triethylamine, or equivalent base, also being employed in excess, if desired. The procedure is illustrated in the examples. A strong base, such as triethylamine, may also be similarly employed for the preparation of 8-substituted thio- and seleno-carbocyanines.

It has also been found that very high yields of dicarbocyanine dyes containing a halogen substituent linked to the central carbon atom of the 5-carbon chain may be obtained by the use of these strong organic bases. These dyes are described in J. C. S. 1932, 260 (cf. B. P. 353, 889) and the present method is regarded as an improvement thereon. In general this reaction is carried out as follows. Two mols. of the alkyl quaternary salt of the cyclic ammonimum base containing a reactive methyl group are dissolved in hot absolute ethyl alcohol and the solution rapidly chilled in ice water. If the quaternary salt separates out, as it usually does, the solution is stirred so as to produce small crystals. 1 mol. of α-bromo-β-anilino-acrolein anil hydrobromide (or α-chloro-β-anilino-acrolein anil hydrochloride, or the like) is then added and the whole stirred. 2 mols. of base, such as piperidine, are then added with good stirring and the whole stood aside in the cold for a day. The dye is then isolated either by filtration, or precipitation with ether or double decomposition with an inorganic salt, such as potassium iodide, which gives a more sparingly soluble salt of the dye, or by a combination of these methods, they being all standard procedure. In most cases the yields are excellent. Variations of this procedure are also given in the appropriate examples.

Unsymmetrical dicarbocyanine dyes containing a halogen substituent attached to the central carbon atom of the 5-carbon chain have not hitherto been described. In order to prepare such dyes it is necessary to prepare an intermediate compound which contains the grouping

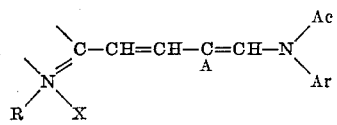

where R=alkyl, X=acidic radical, A=halogen, Ar=aromatic radical such as phenyl and Ac=acyl radical such as acetyl. Such a compound is obtained by heating an alkyl quaternary salt of a cyclic ammonium base containing a reactive methyl group with an anil hydrohalide such as the α-bromo-β-anilino acrolein anil hydrobromide already mentioned in the presence of a suitable solvent such as acetic anhydride. In the case of 1-methylbenzothiazole ethiodide the intermediate formed is very probably

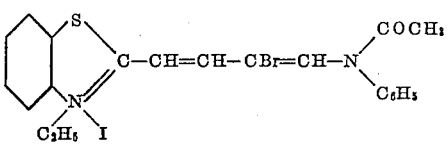

and may be named 1-(4-acetanilido-3-bromo-1,3-butadienyl)-benzothiazole ethiodide, and this compound dissolves with a pinkish orange solution in methyl alcohol.

The intermediate can be combined with a second molecule of alkyl quaternary salt, which may be the same or dissimilar. In the first case the symmetrical dicarbocyanine is formed, and in the second case the dye is unsymmetrical. This step may in general be brought about by taking equimolecular proportions of the intermediate compound and quaternary salt in alcohol (methyl or ethyl) and adding a molecular proportion of a strong base such as piperidine and allowing the whole to stand for some hours. Thus, when 2-methyl thiazoline methiodide is employed in conjunction with 1-(4-acentanilido-3-bromo-1,3-butadienyl)benzothiazole ethiodide the product is 3-methyl-2'-ethyl-8-bromothiazolinothiodicarbocyanine iodide.

The use of the strong organic bases has also proved to be of great use in the preparation of the dyes known as the tricarbocyanines. For instance, the method described in B. P. 354, 826 is much improved if one of the strong bases already mentioned is used in place of the sodium ethylate, there employed, and if the reactions are allowed to proceed at room temperature, or lower, instead of boiling in alcoholic solution. Not only does this improvement result in greatly increased yields, but dyes of the 4,4'-tricarbocyanine class, which cannot be obtained by the method of that patent become readily accessible by my novel method. These dyes have the general formula

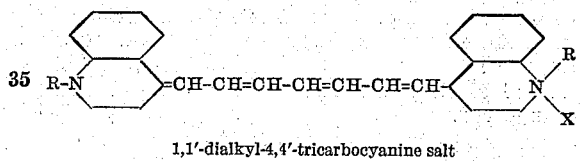

1,1'-dialkyl-4,4'-tricarbocyanine salt and are derived from quaternary salts of lepidine.

Furthermore, the methods of the original patents do not appear to give the thiazolotricarbocyanines, whilst they are readily obtainable using my invention. Thus 2-methylthiazole gives rise to

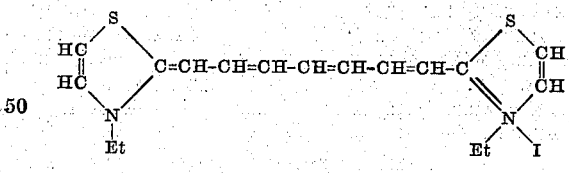

3,3'-diethylthiazolotricarbocyanine iodide whilst 2,4-dimethylthiazole gives rise to a substituted derivative as shown in the examples.

EXAMPLE 1

1,1'-diethyl-ψ-cyanine iodide 3 parts of quinaldine ethiodide (1 mol.) are heated with 4.1 parts (1 mol.) of finely powdered 2-iodoquinoline ethiodide in 30 parts of boiling ethyl alcohol under reflux, and 2.1 (2.1 mols., i. e. 5% excess) parts of triethylamine added down the condenser and the whole well shaken and refluxed for twenty minutes. The dye forms rapidly, is filtered off when cold, washed with water, followed by a little alcohol and dried. The yield of dye is about 3.7 parts which is about 80% of the theoretical.

When tri-n-butylamine is employed (3.7 parts, 2.1 mols.) the conditions being otherwise identical, the yield of dye is 76%. The use of guanidine carbonate (1.9 parts, 1.05 mol.) results in a yield of about 80%.

EXAMPLE 2

2,1'-diethyl-oxa-ψ-cyanine iodide 2.9 parts of 1-methylbenzoxazole ethiodide and 4.1 parts of 2-iodoquinoline ethiodide are treated in 20 parts of boiling absolute ethyl alcohol with 2.1 parts of triethylamine. The dye rapidly separates from the boiling solution and refluxing is continued for a further ten minutes. The washed dye weighs 3 parts (67%) and crystallizes from methyl alcohol in orange needles. Triethanolamine (3.15 parts) gives a yield of about 2 parts of dye and β-diethylaminoethyl alcohol (2.5 parts) gives about the same yield.

EXAMPLE 3

2,1'-diethylthio-ψ-cyanine iodide 3.5 parts of 1-methylbenzothiazole etho-p-toluenesulfonate and 4.1 parts of 2-iodoquinoline ethiodide are treated in 30 parts of boiling ethyl alcohol with 2.1 parts of triethylamine and the mixture refluxed for twenty minutes. The dye separates out and after washing and drying is obtained in a yield of about 90%.

β-diethylaminoethyl alcohol (2.5 parts) similarly used results in a yield of 90%. Guanidine carbonate (1.9 parts) gives a yield of 86% and diethylamine (1.55 parts) gives a yield of 79%.

EXAMPLE 4

7-methyl-1',2-diethylthio-ψ-cyanine iodide 3.2 parts (1 mol.) of 1-ethylbenzothiazole ethiodide (made by condensing equivalent amounts of 1-ethylbenzothiazole and ethyl iodide together in the usual way, and recrystallizing the product), 4.1 parts (1 mol.) of 2-iodoquinoline ethiodide and 18 parts of absolute ethyl alcohol are refluxed together with 2 parts (2 mols.) of triethylamine for 15 minutes. Crystals of the dye separate during the reaction and are filtered off on cooling and washed free from a soluble purplish impurity with a little acetone. The dye may be recrystallized from methyl alcohol and is obtained as small scarlet needles which give an orange solution with the solvent.

EXAMPLE 5

2,1'-diethylseleno-ψ-cyanine iodide 2 parts (1 mol.) of 1-methylbenzoselenazole are heated with 2 parts (1 mol.) of ethyl p-toluenesulfonate at 100° C. for 30 hours. The product, a somewhat brownish viscous mass, is dissolved in 16 parts of hot absolute ethyl alcohol, 4.1 parts (1 mol.) of 2-iodoquinoline ethiodide added, the whole brought to boiling and 2.1 (2.1 mols.) parts of triethylamine added. The dye rapidly separates but heating is continued for 20 minutes. On cooling the dye is removed, washed and purified by crystallization from ethyl alcohol in which it gives an orange solution. The dye forms scarlet needles with a blue reflex.

EXAMPLE 6

1,3,3,1'-tetramethylindo-ψ-cyanine iodide 3 parts (1 mol.) of 2,3,3-trimethylindolenine methiodide and 4.1 parts (1 mol.) of 2-iodoquinoline ethiodide were condensed together refluxing the mixture in 20 parts of absolute ethyl alcohol together with 2.1 parts (2.1 mols.) of triethylamine for 25 minutes. The mixture was cooled, the dye precipitated with ether and washed with water followed by a little acetone. The dye was obtained as a dull brown powder and weighed 3.2 parts (72%). It could be recrystallized from methyl alcohol and formed reddish brown crystals. The yield of dye obtained is much higher than when potash is used.

EXAMPLE 7

1,1'-dimethyl-5,6-benzopyrido-2,2'-cyanine iodide 2.35 parts (1 mol.) of α-picoline methiodide, 4 parts (1 mol.) of 2-iodoquinoline methiodide are heated for 10 minutes under reflux with 2.1 parts (2.1 mols.) of triethylamine and 20 parts of ethyl alcohol. A little unchanged 2-iodoquinoline methiodide is removed by filtration and the solution allowed to cool. The dye separates out together with water soluble products and is purified by washing with water. The yield is around 19%. It crystallizes from methyl alcohol in brown crystals.

EXAMPLE 8

2,1'-diethylthio-2'-pyridocyanine iodide 3.5 parts (1 mol.) of 1-methylbenzothiazole etho-p-toluenesulfonate and 3.6 parts (1 mol.) of 2-iodopyridine ethiodide are heated under reflux for 20 minutes with 12 parts of ethyl alcohol and 2.1 parts (2 mols.) of triethylamine. The dye rapidly separates from the boiling mixture. It is collected when cold, washed and purified by recrystallization from methyl alcohol in which it gives a yellow orange solution. It forms long pale-yellow needles.

EXAMPLE 9

1,1'-dimethyl-2,2'-pyridocyanine iodide 2.4 parts (1 mol.) of α-picoline methiodide, 3.5 parts (1 mol.) of 2-iodopyridine methiodide, 16 parts of absolute ethyl alcohol and 2.1 parts (2.1 mols.) of triethylamine are refluxed together. The dye begins to separate in glittering crystals from the boiling reaction mixture after 3 or 4 minutes, and refluxing is continued for 20 minutes. The dye is removed and is purified by washing with acetone followed by water, and is obtained in beautiful light brown platelets with a bright pale greenish reflex. It may be recrystallized from methyl alcohol when it is obtained in brown granular crystals with a green reflex. The color of the solution is golden-yellow.

EXAMPLE 10

4,1'-dimethyl-3-ethylthiazolo-2'-pyridocyanine iodide 2.7 parts (1 mol.) of 2,4-dimethylthiazole ethiodide, 3.5 parts (1 mol.) of 2-iodopyridine methiodide, 16 parts of absolute ethyl alcohol are brought to boiling, 2.1 parts (2.1 mols.) of triethylamine added and the whole refluxed for 20 minutes. The dye rapidly separates from the boiling solution as a yellow-orange powder. It is removed, washed with acetone followed by water and may then be recrystallized from methyl alcohol in which it gives a yellow-orange solution. It separates as yellow needles or as orange needles with a bright greenish-yellow reflux, or as a mixture of the two forms.

EXAMPLE 11

3,4,1'-trimethylselenazolo-2'-pyridocyanine iodide 2,4-dimethylselenazole metho-p-toluenesulfonate (1 mol.) is prepared by heating 1.6 parts (1 mol.) of 2,4-dimethylselenazole with 1.9 parts (1 mol.) of methyl p-toluenesulfonate for several hours at 100° C. The salt soon solidifies and is dissolved in 12 parts of hot absolute ethyl alcohol, 3.5 g. (1 mol.) of 2-iodopyridine methiodide added, the whole boiled, 2.1 parts (2.1 mols.) of triethylamine added and refluxed for 20 minutes. The dye rapidly separates from the boiling solution. It is removed, washed with acetone followed by water and is obtained as a light-brown crystalline powder. It crystallizes from methyl alcohol, in which it gives a deep yellow-orange solution, in glittering minute brown crystals.

If an equivalent amount (1 mol.) of 2,4-dimethyloxazole be used in place of the 2,4-dimethylselenazole, then in the first stage of the synthesis 2,4-dimethyloxazole metho-p-toluenesulfonate is formed, and in the final stage 3,4,1'-trimethyloxazolo-2'-pyridocyanine iodide. This compound crystallizes in beautiful yellow needles.

EXAMPLE 12

2,1'-diethylselenoisocyanine iodide 2 parts (1 mol.) of 1-methylbenzoselenazole were heated at 100° for a day or two with 2 parts (1 mol.) of ethyl p-toluenesulfonate. The product was boiled with 20 parts of pyridine and 8.6 parts (3 mols. i. e. 200% excess) of quinoline ethiodide and 2 parts (2 mols. i. e. 100% excess) of triethylamine, the latter being added in portions over half a minute to the boiling pyridine solution of the two salts, the whole being then refluxed for 1½ minutes longer. The deep red solution was cooled and stirred with 80 parts of ether and crystals separated. The residue was washed with water followed by acetone. The dye (2 parts, about 38% yield) was obtained in the form of scarlet needles on recrystallizing it from methyl alcohol, the color of the solution being orange-red.

EXAMPLE 13

2,1'-diethylthioisocyanine iodide 3.05 parts (1 mol.) of 1-methylbenzothiazole ethiodide, 5.7 parts (2 mol., i. e. 100% excess) of quinoline ethiodide, and 20 parts of pyridine were boiled together, 2.1 parts (2.1 mols., i. e. 110% excess) of triethylamine added to the boiling solution and the whole refluxed for half an hour. On cooling the dye was precipitated from the reddish solution by adding 50 parts of ether and then washed with ether followed by acetone and then by water. The dye may be crystallized from methyl alcohol in which it forms a pinkish-orange solution.

EXAMPLE 14

7-methyl-2,1'-diethylthioisocyanine iodide 3.2 parts (1 mol.) of 1-ethylbenzothiazole ethiodide, 5.7 parts (2 mols., 100% excess) of quinoline ethiodide and 20 parts of pyridine are heated together, 2.1 parts (2.1 mols., 110% excess) of triethylamine added to the boiling solution and the whole refluxed for 30 minutes. The dye is precipitated by adding 100 parts of ether, the ethereal layer decanted and the residue washed successively with ether, water and acetone until crismson impurities are removed. The dye may be crystallized from methyl alcohol in which it dissolves with pinkish-orange solution.

EXAMPLE 15

8-methyl-2,2'-diethyloxacarbocyanine iodide 2.9 parts (2 mols.) of 1-methylbenzoxazole ethiodide were heated with 15 parts of pyridine, 3.25 parts of ethyl ortho-acetate (4 mols., i. e. 300% excess) and 1.1 parts of triethylamine (2.2 mols., i. e. 120% excess) under reflux for three minutes. The dye is precipitated by adding ether to the cooled solution and is purified by washing with acetone followed by water and is recrystallized from methyl alcohol when it is obtained in red prisms with a blue reflex. The solution is yellowish orange.

Example 16

2,2'-dimethyl-8-ethyloxacarbocyanine iodide 2.7 parts (2 mols.) of 1-methylbenzoxazole is heated with 3.7 parts (2 mols.) of methyl p-toluenesulfonate at 100° C. for some hours to prepare the quaternary salt. This salt is refluxed for seven minutes with 20 parts of pyridine, 7.05 parts (4 mols. i. e. 300% excess) of ethyl orthopropionate and 2.2 parts (2.2 mols., i. e. 120% excess) of triethylamine. The dye is precipitated by the addition of ether, dissolved in methyl alcohol and precipitated as the iodide by the addition of an aqueous solution of potassium iodide (5 g. in 30 cc. of water). The dye is collected, washed, and recrystallized from methyl alcohol in which it dissolves with an orange color. It is obtained as orange-scarlet aggregates of minute crystals or as much larger ones, some sides of which reflect blue light.

Example 17

9-bromo-2,2'-diethylthiodicarbocyanine iodide

This dye was obtained in high yield (94%) as follows: 6.1 parts (2 mols.) of 1-methylbenzothiazole ethiodide were boiled with 60 parts of ethyl alcohol and the solution rapidly chilled with stirring so as to get small crystals of the salt. 3.8 parts (1 mol.) of α-bromo-β-anilino acrolein anil hydrobromide was then added, followed by 1.6 parts (2 mols.) of piperidine. The whole was well shaken and kept at about 0° C. for 12 hours. The dye was then filtered off, washed with cold methyl alcohol and then hot methyl alcohol. It could be purified by recrystallization from methyl alcohol in which it gives a deep blue solution.

If the reaction was carried out in the hot, the yield of dye was found not to be so high.

Example 18

9-bromo-2,2'-diethyl-5,6,5',6',-dibenzothiodicarbocyanine iodide 6 parts (2 mols.) of 1-methyl-α-naphthothiazole etho p-toluenesulfonate, 2.9 parts (1 mol.) of α-bromo-β-anilinoacrolein anil hydrobromide and 25 parts of absolute ethyl alcohol were well mixed together in the cold and 1.3 parts (2 mols.) of piperidine added and the whole stood overnight without heating. The dye which separated was collected, dissolved in hot methyl alcohol and precipitated by adding excess of aqueous potassium iodide, and the same aqueous reagent was also added to the reaction liquor and a further quantity of dye obtained. The combined yields amounted to 5 parts (95% of theory). The brassy-green powder so obtained could be crystallized from methyl alcohol and was obtained as chocolate brown crystals. The solution of the dye is deep blue.

Example 19

11-bromo-1,1'-diethyl-2,2'-dicarbocyanine bromide 6.9 parts (2 mols.) of quinaldine etho-p-toluenesulfonate, 3.8 parts (1 mol.) of α-bromo-β-anilino acrolein anil hydrobromide and 20 parts of ethyl alcohol were mixed well together, chilled in a freezing mixture and 1.7 parts (2 mols.) of piperidine added with good shaking and the whole kept at about 0° C. for 24 hours. Crystals separated during this period and were removed and dissolved in methyl alcohol and reprecipitated with aqueous potassium bromide. The same reagent added to the reaction liquor also furnished more dye. The total yield of washed dye was 4.7 parts (87%). The dye could be recrystallized from methyl alcohol and was so obtained in brassy-green prisms which gave a blue-green solution.

Example 20

11-bromo-1,1'-diethyl-4,4'-dicarbocyanine bromide 10.3 parts (2 mols.) of lepidine etho-p-toluenesulfonate, 5.7 parts (1 mol.) of α-bromo-β-anilino acrolein anil hydrobromide and 20 parts of absolute ethyl alcohol were well mixed together, chilled in a freezing mixture, 2.6 parts (2 mols.) of piperidine added with shaking and the whole kept at 0° C. overnight. The dye which separated was collected and washed with hot acetone until the filtrate was clear and green. The weight of the dried dye was 6.1 parts (70%).

Example 21

3-methyl-2'-ethyl-8-bromothiazolinothiodicarbocyanine iodide

The intermediate compound necessary for the preparation of this compound was made as follows:

Equimolecular proportions of 1-methylbenzothiazole etho p-toluenesulfonate and α-bromo-β-anilinoacrolein anil hydrobromide are heated together in enough acetic anhydride for complete solution for a short time, about one half minute at a little below the boiling point of the solvent. The solution is then cooled somewhat and poured into ether, the residue washed with more ether, then dissolved in methyl alcohol and stirred with aqueous potassium iodide in order to prepare the iodide of the intermediate. The residue was then filtered off and washed with more water and crystallized from methyl alcohol. The compound forms brownish red crystals with a coppery lustre and dissolves in methyl alcohol with a pinkish-orange coloration and may very possibly have the structure

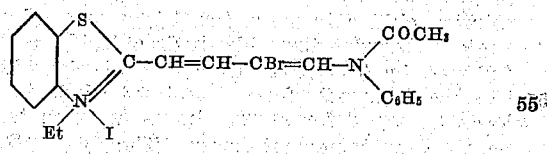

Equimolecular proportions of this compound, 1-(4-acetanilido-3-bromo-1.3-butadienyl)-benzothiazole ethiodide, and of 2-methyl-thiazoline methiodide are stirred in the cold with absolute ethyl alcohol so as to make a very thin paste and 1 mol. of triethylamine added. After some hours the product is collected, washed and recrystallized from methyl alcohol when it is obtained in dark blue lustrous needles which dissolve in the solvent with a purplish-blue color.

This dye sensitizes with a maximum at about λ 6300 A.

Example 22

2,2'-diethylthiotricarbocyanine iodide 3.05 parts (2 mols.) of 1-methylbenzothiazole ethiodide are dissolved in 40 parts of boiling absolute ethyl alcohol and the solution rapidly chilled with ice water to bring about crystallization with production of small crystals. 1.4 parts (1 mol.) of glutaconic aldehyde dianilide hydrochloride is then added, followed by 1 part (2 mols.) of triethylamine. The whole is kept near 0° C. for about 2 days with occasional shaking. The dye is then filtered off, washed with acetone followed by hot water and dried. The yield is around 70%.

Other bases such as n-butylamine, piperidine, tri-n-butylamine may be used, and all give good yields of the dye.

If 1-methyl-α-naphthothiazole ethiodide (2 mols.) is used in place of the quaternary salt used above, the dye obtained is 2,2'-diethyl-5,6,5',6'-dibenzothiotricarbocyanine iodide which crystallizes in coppery crystals which give a green solution in alcohol.

EXAMPLE 23

*1,1'-diethyl-2,2'-tricarbocyanine iodide*

6.9 parts (2 mols.) of quinaldine etho-p-toluenesulfonate, 2.8 parts (1 mol.) of glutaconic aldehyde dianilide hydrochloride and 22 parts of absolute ethyl alcohol are mixed up together and the suspension chilled in a mixture of ice and concentrated hydrochloric acid. 1.7 parts (2 mols.) of piperidine are then added, with shaking and the whole kept at about 0° C. for a day. At the end of this time crystals had separated. These were dissolved in hot methyl alcohol, precipitated with aqueous potassium iodide and the reaction filtrate similarly treated. The total amount of crude dye was collected on a filter and washed with successive lots of hot acetone and finally hot-methyl alcohol to remove tars and bluish impurities. When the filtrate was a clear green color washing was discontinued. The yield of crude dye amounts to 2.6 parts (49%). On slow crystallization from methyl alcohol, magnificent brassy crystals were obtained. The yield of recrystallized material was 2.3 parts (43%).

EXAMPLE 24

*2,2'-diethylselenotricarbocyanine bromide*

2 parts (2 mols.) of 1-methylbenzoselenazole are heated for a day with 2 parts (2 mols.) of ethyl p-toluenesulfonate at 100°. The product is dissolved in 12 parts of absolute ethyl alcohol, the solution chilled in ice-water, 1.4 parts of glutaconic aldehyde dianalide hydrochloride added followed by 0.85 parts (2 mols.) of piperidine. The dye is rapidly formed and the whole is allowed to stand for several hours at room temperature or somewhat lower. The dye is then precipitated with aqueous potassium bromide, collected, washed clean with water followed by acetone, and purified by recrystallization from methyl alcohol. It separates in beautiful green needles and gives a deep greenish blue solution.

EXAMPLE 25

*1,1'-diethyl-4,4'-tricarbocyanine iodide*

12 parts (2 mols.) of lepidine ethiodide were dissolved in 25 parts of absolute ethyl alcohol and the solution chilled in a freezing mixture with stirring, so as to obtain very small crystals of the quaternary salt. 5.6 parts (1 mol.) of glutaconic alehyde dianilide hydrochloride were then added, the mixture stired, and then 3.4 parts (2 mols.) of piperidine added, with cooling and shaking. A dark coloration rapidly developed and the whole was stood aside in the ice box overnight. Next morning the muddy liquors were filtered off, the residue washed with acetone until most of the tarry impurities had disappeared, followed by water and then more acetone. The residue was next boiled with a small quantity of methyl alcohol, cooled and filtered, and this treatment repeated once or twice until the filtrate was a clear green color and the dye on the filter looked clean. It then consisted of coppery crystals and gave a somewhat dull green solution. The dye could be successfully recrystallized from methyl alcohol, especially if the hot liquors were chilled so as to expose the dye to the action of the hot alcohol for as short a time as possible.

Lepidine methiodide, treated in the same fashion (11.4 parts are required) gave the dye 1,1'-dimethyl-4,4'-tricarbocyanine iodide. This was recrystallized from methyl alcohol and obtained as a dark brown crystalline powder, and the color of the solution was olive green. Lepidine alliodide similarly yielded 1,1'-diallyl-4,4'-tricarbocyanine iodide, which was obtained in beautiful reddish coppery crystals. Triethylamine (2 mols.) could be substituted for the piperidine used in the above method.

EXAMPLE 26

*3,3'-diethylthiazolinotricarbocyanine iodide*

5.1 parts (2 mols.) of 2-methylthiazoline were heated for 4 hours at 100° with 10 parts (2 mols.) of ethyl-p-toluenesulfonate. The yellowish viscous product was used without further purification, being dissolved in 25 parts of ethyl alcohol, the solution well chilled in a freezing mixture, 7 parts (1 mol.) of glutaconic aldehyde dianilide hydrochloride added to the solution followed by 4.3 parts (2 mols.) of piperidine. There was an instant very dark coloration and the whole was stood aside in the ice box overnight. Crystals of the p-toluenesulfonate of the dye separated on stirring in 70 parts of cold ether. The ethereal layer was poured off and the residue stirred with 40 parts of acetone and filtered. The yield of air-dried dye is around 80%. The dye is then dissolved in hot methyl alcohol (25 parts) and precipitated by adding a solution of excess of potassium iodide (10 parts) in hot water (25 parts). The steely crystals could be crystallized from methyl alcohol in which they dissolved with a deep blue color.

EXAMPLE 27

*3,3'-diethylthiazolotricarbocyanine iodide*

2-methylthiazole etho-p-toluenesulfonate is prepared by heating 4 parts (2 mols.) of 2-methylthiazole with 8 parts (2 mols.) of ethyl p-toluenesulfonate for 30 hours at 100°. The product is dissolved in 20 parts of absolue ethyl alcohol, the solution chilled in ice water, 5.6 parts (1 mol.) of glutaconic aldehyde dianilide hydrochloride added and then 3.4 parts (2 mols.) of piperidine. The whole is well shaken and stood in the icebox for about 120 hours. The deep blue liquid is then mixed with an excess of cold aqueous potassium iodide and the dye is precipitated, removed by filtration and washed with water. It is then treated with acetone, in which it dissolves readily, and on standing or on rubbing with a glass rod the dye separates out in beautiful greenish bronze crystals relatively insoluble in the solvent. These crystals are removed and may be recrystallized from methyl alcohol, the color of the solution being deep blue. The dye is then obtained in green needles, some facets of which reflect blue light and others brassy-green light.

EXAMPLE 28

*3,4,3',4'-tetramethylthiazolotricarbocyanine bromide*

12 parts (2 mols.) of 2,4-dimethylthiazole metho-p-toluenesulfonate (made by condensing together equimolecular proportions of 2,4-dimethylthiazole and methyl p-toluenesulfonate) are dissolved in 24 parts of hot absolute ethyl alcohol, the solution rapidly chilled in a freezing mixture, 5.6 parts (1 mol.) of glutaconic aldehyde dianilide hydrochloride added, 3.4 parts (2 mols.) of piperidine, the whole well shaken, and stood aside for 6 days at 0–10° C. with occasional shaking. The dye separates out and is removed by filtration at the end of the period, impurities being removed by washing with acetone followed by water. The dye (probably the p-toluenesulfonate) forms a dull green powder which may be recrystallized from methyl alcohol, or, the methyl alcoholic solution may be treated with excess of aqueous potassium bromide, when the bromide of the dye separates out. This may be removed and recrystallized from methyl alcohol and it separates in green lustrous crystals which give a deep blue solution.

From the foregoing description and numerous examples, it will be apparent that the use of a strong organic base as a condensing agent for the preparation of cyanine dyes has quite broad and general application. By its use, the yields of a large number of dyes is vastly improved and the synthesis of a number of dyes which have heretofore defied preparation, is made possible. While many more examples could be given, the foregoing are thought to be sufficient to teach the application of my method to cyanine dye reactions in general, and it is a striking fact that the simplest $\psi$-cyanine having the general formula

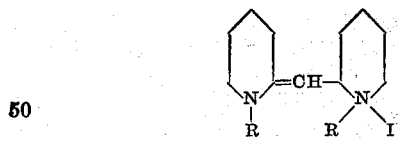

and also the dye having the longest chain of carbon atoms connecting the two nitrogen atoms yet discovered and having the general formula.

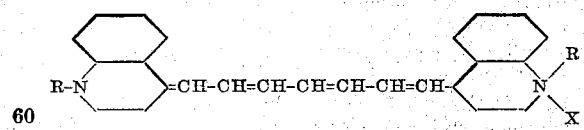

are both rendered accessible by this method.

While I have described the use of a considerable number of strong organic bases, it will be apparent to those skilled in the art that any strong organic base having similar properties may likewise be employed. In the claims appended hereto, when the term "strong organic base" is used, it is not intended to include bases such as pyridine and quinoline, which are of an aromatic type. Furthermore, I employ these bases in molecularly equivalent quantities, rather than in traces as catalysts.

More specifically, it will be observed that the strong organic bases which I prefer to employ, form a group which in general comprises aliphatic bases of the substituted ammonia type known as aliphatic amines. These amines may be primary, secondary or tertiary amines, the use of all of these types being illustrated in the examples. It is also convenient to employ some of these bases in the form of their salts with weak acids, such as carbonic acid. There is a great variety of such bases available and it is not intended that the concept should be applied too restrictively. For instance, guanidine (in the form of its carbonate) is effective, while at the same time it is not strictly regarded as an aliphatic amine.

The nomenclature of the new dyes described in this application is based upon that already in common use.

The numbering of the seleno-$\psi$-cyanine and seleno-isocyanine rings exactly follows that used in the cases of the related sulfur-containing dyes.

In the case of $\psi$-cyanine and iso-cyanine dyes in which the hydrogen of the methenyl group is substituted by alkyl, such as methyl, the position of this group is specified by numbering the molecule as shown.

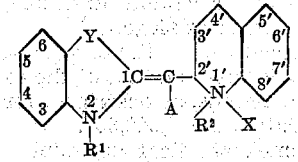

and

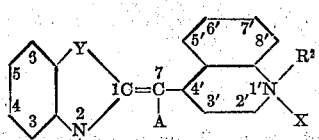

where $R^1$ and $R^2$ are alkyl groups and X is an acidic radical and A is an alkyl group, preferably methyl. Y may be S or Se.

The dye

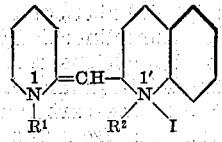

may be considered as a 1,1'-dialkyl-2-pyrido-$\psi$-cyanine iodide or as 1,1'-dialkyl-2-pyrido-2'-cyanine iodide or as 1,1'-dialkyl-5,6 (or 5',6')-benzo-2,2'-pyridocyanine iodide. In the first of these names, the dye is regarded as a $\psi$-cyanine derived from quinoline and in the third name, the dye is regarded as a simple 2,2'-pyrido-cyanine with a benzene ring fused on to one of the pyridine rings.

The dye

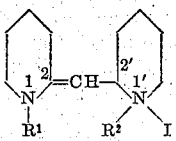

is named 1,1'-dialkyl-2,2'-pyridocyanine iodide, the symbol (pseudo) being omitted since it is believed that the substitution of numbers leads to a clearer system of nomenclature.

The dye

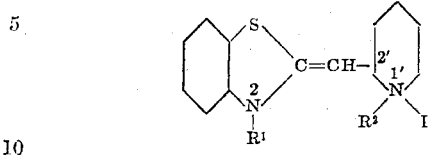

is named 2,1'-dialkylthio-2'-pyridocyanine iodide, the numerals in the pyridine nucleus being primed (dashed) by analogy with the numerals in the quinoline nucleus of thio-ψ-cyanine.

Similarly the dye below

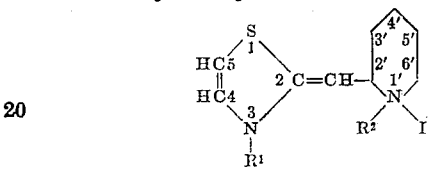

is named 3,1'-dialkylthiazolo-2'-pyridocyanine iodide, the use of the term "thiazolo" indicating the presence of the thiazole nucleus, which for simplicity retains its own (Ritcher) system of numbering. The selenium and oxygen compounds are precisely analogous.

The nomenclature of the 8-substituted oxacarbocyanines is based on that of the corresponding sulfur compounds, as described, for instance, in my U. S. Patent No. 1,846,301.

The unsymmetrical dicarbocyanine

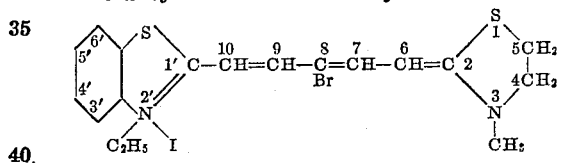

is considered as a dicarbocyanine which contains a benzothiazole nucleus and a thiazoline nucleus. Presence of the former nucleus in a cyanine dye has for long been indicated by the use of the prefix "thio," whilst "thiazolino" has been used (in my copending application No. 460,548) to indicate the presence of the thiazoline nucleus. Since both prefixes are required, they are chosen in alphabetical order and the dye is named a thiazolinothiodicarbocyanine. The numerals in the nucleus corresponding to the second prefix of the name, i. e. thio, are primed (dashed) and the carbon atoms of the chain are numbered out from the nucleus containing the plain numerals, as shown. The full name then becomes 3-methyl-2'-ethyl-8-bromothiazolinothiodicarbocyanine iodide.

It is quite clear that in the pseudocyanines and isocyanines and unsymmetrical dicarbocyanines, etc. the alkyl groups may be like or unlike.

All of the dye syntheses mentioned in this application involve the use of one or two molecular proportions (to every molecular proportion of dye product, as shown in the equation of the reaction) of an alkyl quaternary salt of a nitrogen-containing cyclammonium base containing a reactive methyl (or mono-substituted methyl) group. In the claims such a salt is, for the sake of brevity defined as a "cyclammonium alkyl quaternary salt".

It will be apparent to those skilled in the art that a great variety of alkyl quaternary salts of these heterocyclic ammonium bases containing reactive methyl, etc., groupings is available for the cyanine dye syntheses described in this application. The use of many of these salts is indicated in the examples. Others were dealt with in my copending application No. 619,960. The parent bases such as 1-methylbenzoxazole or 1-methylbenzothiazole may be substituted in the available positions, but this does not affect or diminish the scope of this invention.

In the pseudocyanine condensation, the tertiary bases give the best results and of these, triethylamine is usually the most reliable, although it is pointed out that some of the other bases also give good yields of dye. In some of the other condensations, the difference is not so marked, and both piperidine, a secondary base, and triethylamine, a tertiary base for example, are valuable in the preparation of the di- and tricarbocyanines. For any particular condensation, the most satisfactory base is soon determined by a series of comparative experiments.

All of the dyes herein described have the property to a greater or lesser degree of sensitizing photographic emulsions, such as gelatino-silverhalide emulsions, so as to make those emulsions responsive to the light in various portions of the spectrum. Such emulsions are described and claimed in applications of even date.

What I claim as my invention and desire to be secured by Letters Patent of the United States is:

1. In a process for the preparation of a cyanine dye containing a polymethenyl chain, said process being selected from the group consisting of a process wherein two molecular proportions of a cyclammonium quaternary salt substance containing a reactive alkyl group are condensed with one molecular proportion of other substance which provides a part of the polymethenyl chain and the elements of acid are eliminated from the condensing substances, and a process wherein one molecular proportion of a cyclammonium quaternary salt substance containing a polymethenyl chain is condensed with one molecular proportion of a cyclammonium quaternary salt substance containing a reactive alkyl group and the elements of acid are eliminated from the condensing substances, the step which comprises employing an organic base whose dissociation constant is substantially greater than that of pyridine in quantity sufficient to bind the elements of acid eliminated.

2. In a process for the preparation of a cyanine dye containing a polymethenyl chain wherein two molecular proportions of a cyclammonium quaternary salt substance containing a reactive methyl group are condensed with one molecular proportion of other substance which provides a part of the polymethenyl chain and the elements of acid are eliminated from the condensing substances, the step which comprises employing a non-cyclic organic nitrogen base whose dissociation constant is substantially greater than that of pyridine in quantity sufficient to bind the elements of acid eliminated.

3. In a process for the preparation of a cyanine dye containing a polymethenyl chain wherein two molecular proportions of a cyclammonium quaternary salt substance containing a reactive methyl group are condensed with one molecular proportion of other substance which provides a part of the polymethenyl chain and the elements of acid are eliminated from the condensing substances, the step which comprises employing an aliphatic amine whose dissociation constant is substantially greater than that of pyridine in quantity sufficient to bind the elements of acid eliminated.

4. In a process for the preparation of a cyanine dye containing a polymethenyl chain wherein two molecular proportions of a cyclammonium quaternary salt substance containing a reactive methyl group are condensed with one molecular proportion of other substance which provides a part of the polymethenyl chain and the elements of acid are eliminated from the condensing substances, the step which comprises employing an alkyl amine whose dissociation constant is substantially greater than that of pyridine in quantity sufficient to bind the elements of acid eliminated.

5. In a process for the preparation of a cyanine dye containing a polymethenyl chain wherein two molecular proportions of a cyclammonium quaternary salt substance containing a reactive methyl group are condensed with one molecular proportion of other substance which provides a part of the polymethenyl chain and the elements of acid are eliminated from the condensing substances, the step which comprises employing a trialkyl amine whose dissociation constant is substantially greater than that of pyridine in quantity sufficient to bind the elements of acid eliminated.

6. In a process for the preparation of a cyanine dye containing a polymethenyl chain wherein two molecular proportions of a cyclammonium quaternary salt substance containing a reactive methyl group are condensed with one molecular proportion of other substance which provides a part of the polymethenyl chain and the elements of acid are eliminated from the condensing substances, the step which comprises employing triethylamine in quantity sufficient to bind the elements of acid eliminated.

7. In a process for the preparation of a cyanine dye containing a heptamethenyl chain wherein two molecular proportions of a cyclammonium quaternary salt substance containing a reactive methyl group are condensed with one molecular proportion of a condensation substance of glutaconic aldehyde and a primary aromatic amine and the elements of acid are eliminated from the condensing substances, the step which comprises employing an organic base whose dissociation constant is substantially greater than that of pyridine in quantity sufficient to bind the elements of acid eliminated.

8. In a process for the preparation of a cyanine dye containing a heptamethenyl chain wherein two molecular proportions of a cyclammonium quaternary salt substance containing a reactive methyl group are condensed with one molecular proportion of a glutaconic aldehyde dianilide hydrochloride substance and the elements of acid are eliminated from the condensing substances, the step which comprises employing piperidine in quantity sufficient to bind the elements of acid eliminated.

9. In a process for the preparation of a cyanine dye containing a heptamethenyl chain wherein two molecular proportions of a cyclammonium quaternary salt substance containing a reactive methyl group are condensed with one molecular proportion of a glutaconic aldehyde dianilide hydrochloride substance and the elements of acid are eliminated from the condensing substances, the step which comprises employing triethylamine in quantity sufficient to bind the elements of acid eliminated.

10. In a process for the preparation of a cyanine dye containing a heptamethenyl chain wherein two molecular proportions of a thiazoline quaternary salt substance having a reactive methyl group in the alpha position to the quinquevalent nitrogen atom are condensed with one molecular proportion of a glutaconic aldehyde dianilide substance and the elements of acid are eliminated from the condensing substances, the step which comprises employing an organic base whose dissociation constant is substantially greater than that of pyridine in quantity sufficient to bind the elements of acid eliminated.

11. In a process for the preparation of a cyanine dye containing a heptamethenyl chain wherein two molecular proportions of a benzoselenazole quaternary salt substance having a reactive methyl group in the alpha position to the quinquevalent nitrogen atom are condensed with one molecular proportion of a glutaconic aldehyde dianilide substance and the elements of acid are eliminated from the condensing substances, the step which comprises employing an organic base whose dissociation constant is substantially greater than that of pyridine in quantity sufficient to bind the elements of acid eliminated.

12. In a process for the preparation of a cyanine dye containing a heptamethenyl chain wherein two molecular proportions of a thiazole quaternary salt substance having a reactive methyl group in the alpha position to the quinquevalent nitrogen atom are condensed with one molecular proportion of a glutaconic aldehyde dianilide substance and the elements of acid are eliminated from the condensing substances, the step which comprises employing an organic base whose dissociation constant is substantially greater than that of pyridine in quantity sufficient to bind the elements of acid eliminated.

13. In a process for the preparation of a cyanine dye containing a heptamethenyl chain wherein two molecular proportions of a selenazole quaternary salt substance having a reactive methyl group in the alpha position to the quinquevalent nitrogen atom are condensed with one molecular proportion of a glutaconic aldehyde dianilide substance and the elements of acid are eliminated from the condensing substances, the step which comprises employing an organic base whose dissociation constant is substantially greater than that of pyridine in quantity sufficient to bind the elements of acid eliminated.

14. In a process for the preparation of a cyanine dye containing a heptamethenyl chain wherein two molecular proportions of a 2-methylthiazolinealkyl-p-toluenesulfonate substance are condensed with one molecular proportion of a glutaconic aldehyde dianilide hydrochloride substance and the elements of acid are eliminated from the condensing substances, the step which comprises employing piperidine in quantity sufficient to bind the elements of acid eliminated.

15. In a process for the preparation of a cyanine dye containing a heptamethenyl chain wherein two molecular proportions of a 2-methylthiazoline-ethyl-p-toluenesulfonate substance are condensed with one molecular proportion of a glutaconic aldehyde dianilide hydrochloride substance and the elements of acid are eliminated from the condensing substances, the step which comprises employing piperidine in quantity sufficient to bind the elements of acid eliminated.

16. In a process for the preparation of a cyanine dye containining a heptamethenyl chain wherein two molecular proportions of a 1-methylbenzoselenazole alkyl-p-toluenesulfonate substance are condensed with one molecular proportion of a glutaconic aldehyde dianilide hydrochloride substance and the elements of acid are eliminated from the condensing substances, the step which comprises employing piperidine in quantity sufficient to bind the elements of acid eliminated.

17. In a process for the preparation of a cyanine dye containing a heptamethenyl chain wherein two molecular proportions of a 1-methylbenzoselenazole ethyl-p-toluenesulfonate substance are condensed with one molecular proportion of a glutaconic aldehyde dianilide hydrochloride substance and the elements of acid are eliminated from the condensing substances, the step which comprises employing piperidine in quantity sufficient to bind the elements of acid eliminated.

LESLIE G. S. BROOKER.